United States Patent [19]

Maddox

[11] Patent Number: 5,334,825
[45] Date of Patent: Aug. 2, 1994

[54] SYSTEM AND METHOD FOR MONITORING BARCODE LABEL QUALITY

[75] Inventor: Craig E. Maddox, Lilburn, Ga.

[73] Assignee: NCR Corporation, Dayton, Ohio

[21] Appl. No.: 874,771

[22] Filed: Apr. 27, 1992

[51] Int. Cl.$^5$ .................. G06K 5/00; G06K 9/03
[52] U.S. Cl. .................... 235/437; 235/383; 235/462
[58] Field of Search .............. 235/462, 383, 437

[56] References Cited

U.S. PATENT DOCUMENTS

| | | | |
|---|---|---|---|
| 4,860,226 | 8/1989 | Martin et al. | 235/437 |
| 5,194,720 | 3/1993 | Reinnagel et al. | 235/437 |
| 5,194,722 | 3/1993 | Mergenthaler et al. | 235/463 |

OTHER PUBLICATIONS

U.S. patent application Ser. No. 07/517,910, filed May 2, 1990 (NCR Docket No. 4658).
U.S. patent application Ser. No. 07/517,911, filed May 2, 1990 (NCR Docket No. 4659).
U.S. patent application Ser. No. 07/762,702, filed Sep. 19, 1991 (NCR Docket No. 4608).
U.S. patent application Ser. No. 07/793,934, filed Nov. 15, 1991 (NCR Docket No. 5072).

*Primary Examiner*—Andrew M. Dolinar
*Attorney, Agent, or Firm*—Paul W. Martin

[57] ABSTRACT

A system and method for monitoring barcode label quality at a point of sale which alerts an operator of a defective label and stores the number of defective labels for each manufacturer. The system includes an optical scanner, including a controller and a memory, a quality indicator, and a point-of-service terminal. The system may additionally include a central host computer. The method of the present invention puts the scanner in predetermined operating modes which activate the quality monitoring functions listed above.

15 Claims, 4 Drawing Sheets

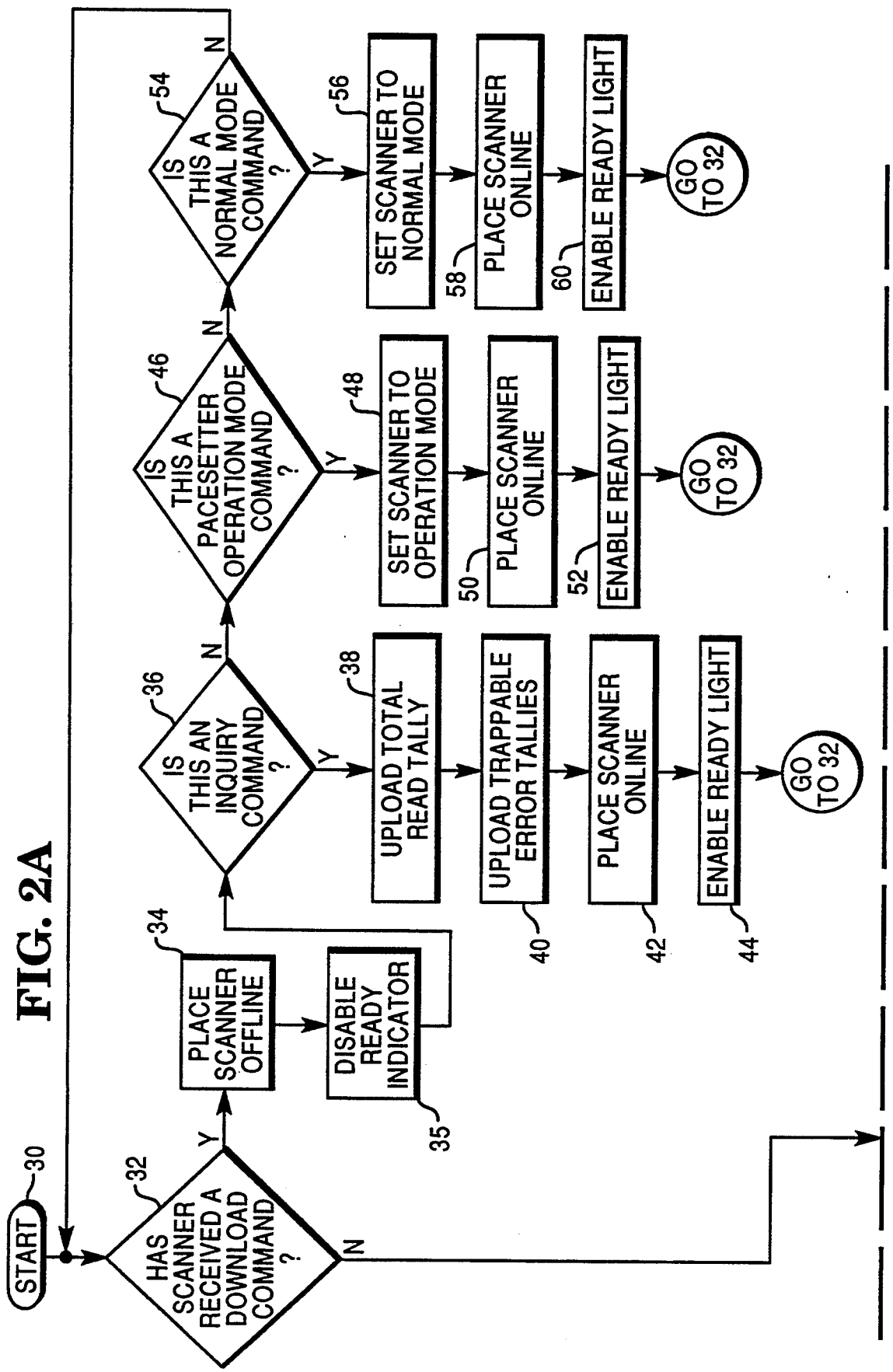

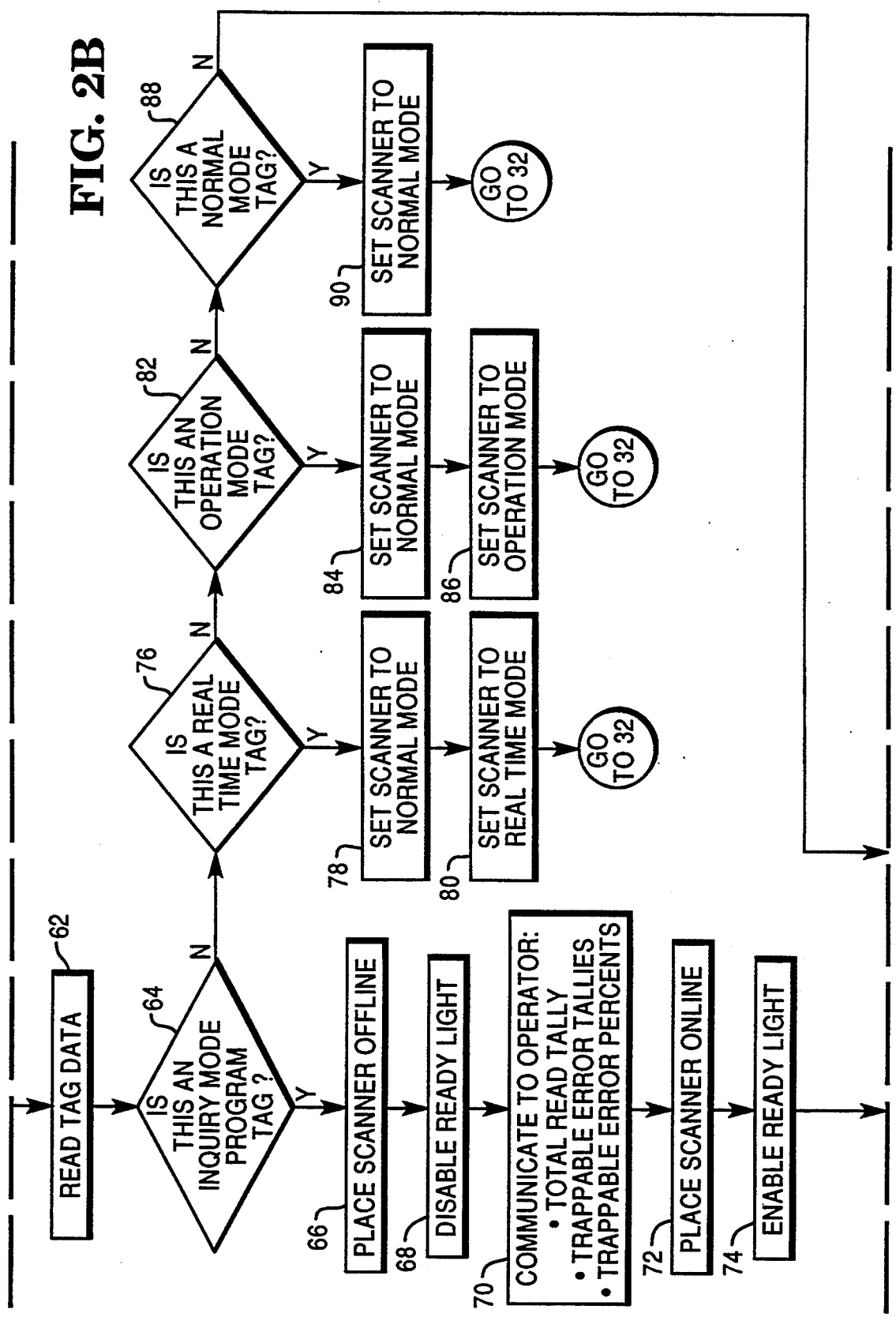

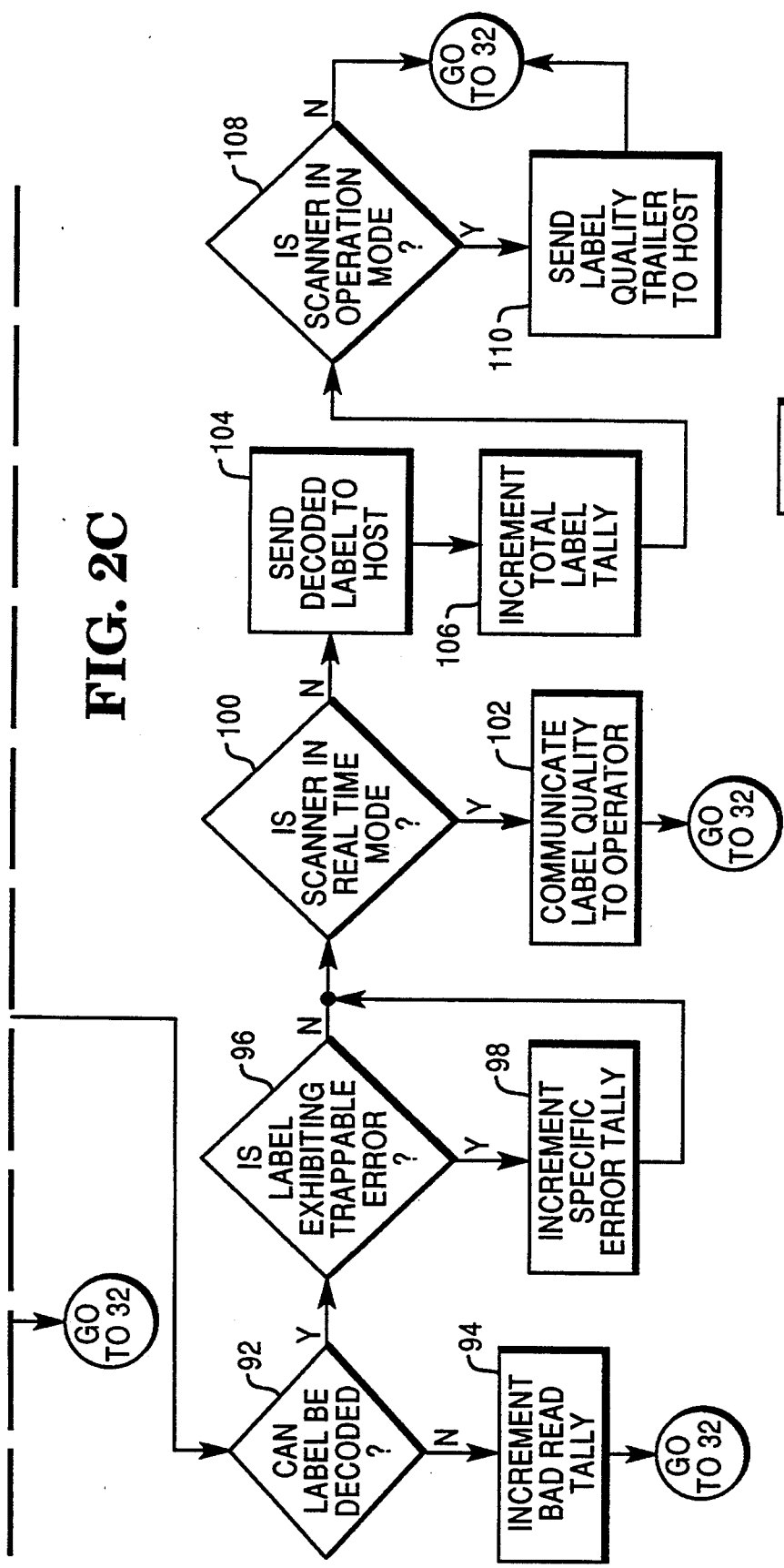

SYSTEM AND METHOD FOR MONITORING BARCODE LABEL QUALITY

CROSS REFERENCE TO RELATED APPLICATIONS

The present invention is related to the following commonly assigned and co-pending U.S. applications:

"Programming Apparatus and Method for Optical Scanners", invented by Wike et al , having a Ser. No. 07/762,702, now U.S. Pat. No. 5,185,514;

"Enhanced UPC Bar Code Decoding System", invented by Mergenthaler etal., having a Ser. No. 07/517,910, now abandoned;

"Enhanced UPC Bar Code Decoding Method", invented by Blanford, having a Ser. No. 07/517,911, now abandoned; and "Multiple Bar Code Decoding System and Method", invented by Tom etal., having a Ser. No. 07/793,934, now U.S. Pat. No. 5,262,625;

BACKGROUND OF THE INVENTION

The present invention relates to optical scanners and barcode labels, and more specifically to a system and method for monitoring barcode label quality.

Manufacturers of optical scanners have long been blamed for the random inability of scanners to read defective barcode labels. Defects may include overprinting, underprinting, illegal margins, and missing bars.

The Universal Code Council (UCC) has been striving to encourage companies who mark their products with barcode labels to maintain, or in some cases, improve label quality, but this effort has been largely unsuccessful to date.

Therefore, it would be desirable to provide a system and method for monitoring barcode label quality at a point of sale that will recognize defective barcode labels, correct the defects to make the barcode labels readable, report defective labels to scanner operators, and store label standard violations.

SUMMARY OF THE INVENTION

In accordance with the teachings of the present invention, a system and method for monitoring barcode label quality is provided. The system includes an optical scanner, including a controller and a memory, a quality indicator, and a point-of-service terminal. The system may additionally include a central host computer.

The method of the present invention puts the scanner in predetermined operating modes which activate the quality monitoring functions listed above. An operator is alerted to the presence of a defective label. A visual or aural message may be communicated to the operator. The total number of labels and the number of defective labels is stored, preferably for each barcode label. The method also includes the step of fixing a predetermined number of defective barcode labels.

It is accordingly an object of the present invention to provide a system and method for monitoring barcode label quality.

It is another object of the present invention to provide a system and method for monitoring barcode label quality which alerts an operator of the presence of a defective barcode label.

It is another object of the present invention to provide a system and method for monitoring barcode label quality which tallies the total number of barcode labels, the number of defective barcode labels, and the percentage of defective barcode labels, preferably for each barcode label, and, therefore, for each manufacturer.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIGS. 2 and 2A through 2C are flow diagrams illustrating the method of the present invention.

DETAILED DESCRIPTION OF THE PREFERRED EMBODIMENT

Figure 1:
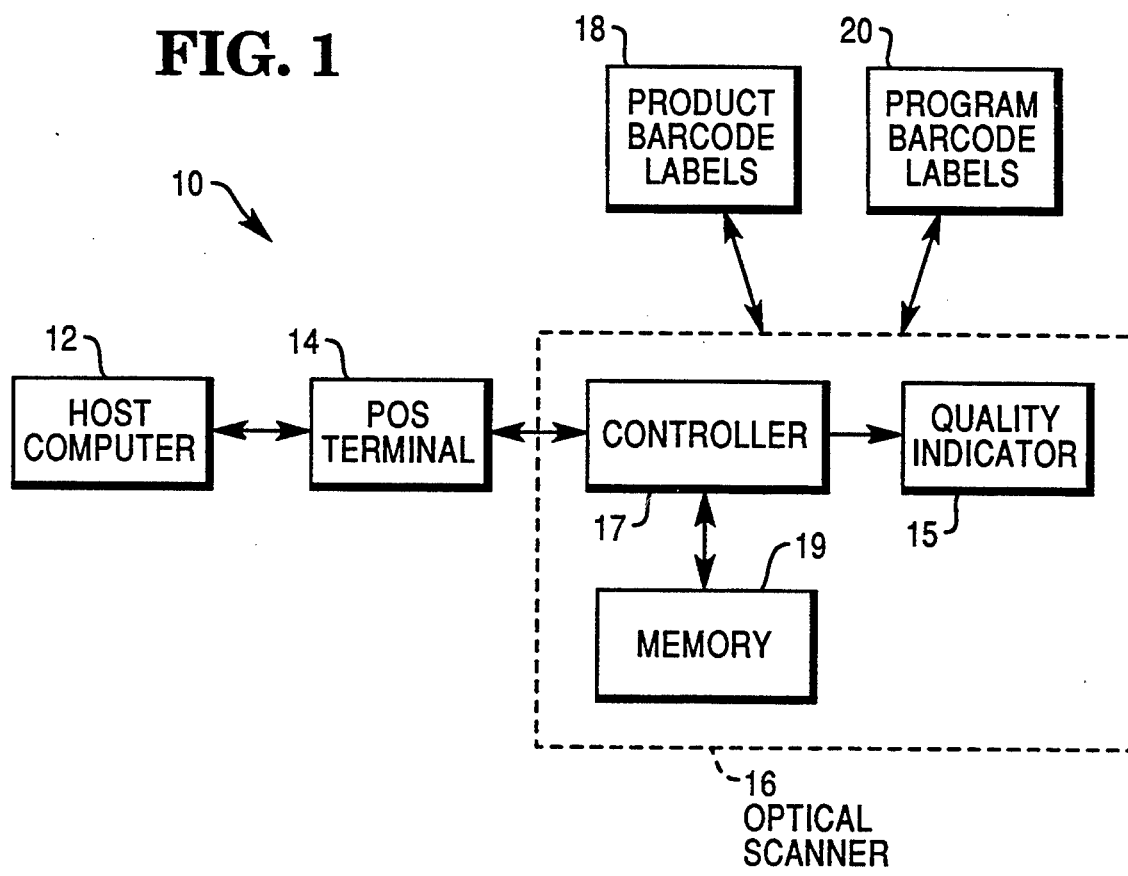
FIG. 1 is a block diagram of the system of the present invention.

Referring now to FIG. 1, system 10 includes host computer 12, point-of-service (POS) terminal 14, and optical scanner 16. Optical scanner 16 scans product barcode labels 18 and program barcode labels 20. Program barcode labels 20 may also be referred to as "tags". Program barcode labels 20 place optical scanner 16 in predetermined modes of operation, in which scanner 16 is taken off-line by disconnecting it from terminal 14 and host computer 12. A scanner ready light indicates to an operator that the scanner is ready to scan product labels 18 or a subsequent program label 20.

Scanner 16 further includes controller 17 for performing quality monitoring tasks under the predetermined modes of operation and memory 19 for storing quality information. Controller 17 contains programming for making readable a predetermined number of defective barcode labels, for tallying the number of barcode labels read, and for tallying the number of defective barcode labels.

Scanner 16 also includes quality indicator 15, which provides an indication of an inferior barcode label to an operator. Quality indicator 15 may be a separate device, but in either case, it may include a display or a speaker.

Optical scanner 16 sends price and other product information contained in product barcode labels 18 to POS terminal 14. It may also convey barcode quality information to POS terminal 14.

POS terminal 14 sends daily sales information and barcode quality information to host computer 12.

Under the method of the present invention, optical scanner 16 is capable of reading barcode labels of inferior quality, tallying the number of inferior barcode labels for each manufacturer, reporting the occurrence of an inferior barcode label to a POS terminal operator, reporting the number of inferior barcode labels to host computer 12, and storing the tallies in memory 17. Scanner tallies may be reset to zero by scanning a "reset" label or by sending an instruction from host computer 12 or terminal 14.

The present invention envisions four modes of operation. Under the "normal" mode of operation, optical scanner 16 reads product barcode labels 18, identifies and determines what is wrong with inferior barcode labels, increments label quality tallies, fixes damaged barcode labels, and passes accurate information to POS terminal 14.

Under the "inquiry" mode of operation, optical scanner 16 provides a displayed or spoken summary of bad read and total read tallies, as well as the ratio of inferior labels by type to total reads. It also provides good read tallies and ratios of good tallies to total reads.

Under the "real time" mode of operation, optical scanner 16 operates in an offline fashion and communicates, either aurally or visually, a message identifying label quality as barcode labels are scanned.

Under the "operation" mode of operation, optical scanner 16 reads barcode labels, identifies and determines what is wrong with inferior barcode labels, stores tallies by label quality, fixes damaged codes and passes accurate information to POS terminal 14, followed by a code to describe label quality.

Referring now to FIGS. 2A through 2C, the method of the present invention is explained in more detail, beginning with START 30. In block 32, the method awaits a downloaded command or a read from a program barcode label 20. If programming instructions have been received by scanner 16, then the method proceeds to block 34. Otherwise, a bar code label is scanned in block 62. In block 34, scanner 16 is taken offline. In block 35, the scanner ready light is disabled.

In block 36, the method determines whether the program barcode label 20 contained an inquiry mode command. If so, then the method proceeds to block 38, in which the total number of barcode labels read (total read tally) is uploaded. In block 40, the number of detectable errors by type (trappable error tallies) is uploaded. In block 42, scanner 16 is online. In block 44, the scanner ready light is enabled. The method then returns to block 32.

Referring back to block 36, if the program barcode label 20 did not contain an inquiry mode command, then the method proceeds to block 46, in which the method determines whether program barcode label contained an operation mode command. If so, then the method proceeds to block 48, in which scanner 16 is placed in the operation mode. In block 50, scanner 16 is placed online. In block 52, the scanner ready light is enabled. The method then returns to block 32.

Referring back to block 46, if the program barcode label 20 did not contain an operation mode command, then the method proceeds to block 54, in which the method determines whether program barcode label contained a normal operation mode command. If so, then the method proceeds to block 56, in which scanner 16 is placed in the normal mode. In block 58, scanner 16 is online. In block 60, the scanner ready light is enabled. The method then returns to block 32.

Referring back to block 54, if the program barcode label 20 did not contain inquiry mode, operation mode, or normal mode commands, then the command is ignored and the method proceeds back to block 32.

Referring back to block 32, if a downloaded command has not been received, the method proceeds to block 62 to read a barcode label. In block 64, the method determines whether the scanned barcode label contained an inquiry mode command. If so, then the method proceeds to block 66, in which scanner 16 is placed offline. In block 68, the scanner ready light is disabled. In block 70, scanner 16 communicates the total number of barcode labels read (total read tally), the number of errors by type (trappable error tallies), and the percentage of error tallies by type out of total reads (trappable error percentage) to an operator. In block 72, scanner 16 is placed online. In block 74, the scanner ready light is enabled. The method then returns to block 32.

Referring back to block 64, if the barcode label does not contain an inquiry mode command, then the method proceeds to block 76, in which the method determines whether the barcode label contained a real time mode command. If so, then the method proceeds to block 78, in which scanner 16 is placed in the normal mode of operation. In block 80, scanner 16 is placed in the real time mode of operation. The method then returns to block 32.

Referring back to block 76, if the barcode label does not contain a real time mode command, then the method proceeds to block 82, in which the method determines whether the barcode label contained an operation mode command. If so, then the method proceeds to block 84 in which scanner 16 is placed in the normal mode of operation. In block 86, scanner 16 is placed in the operation mode. The method then returns to block 32.

Referring back to block 82, if the barcode label does not contain an operation mode command, then the method proceeds to block 88, in which the method determines whether the barcode label contained a normal mode command. If so, then the method proceeds to block 90 in -which scanner 16 is placed in the normal mode of operation. The method then returns to block 32.

Referring back to block 88, if the barcode label did not contain a normal mode command, then the method proceeds to block 92, in which the method determines whether the scanned barcode label can be decoded. If not, then the bad read tally is incremented in block 94. The method then returns to block 32.

Referring back to block 92, if the scanned label can be decoded, then the method proceeds to block 96 in which the method determines whether the label exhibits trappable error. If so, then the specific trappable error tally for that type is incremented in block 98 and the method proceeds to block 100. Otherwise, the method proceeds directly to block 100.

In block 100, the method determines whether scanner 16 is operating in the real time mode. If so, then the method proceeds to block 102 in which label quality is communicated to the operator via quality indicator 15. Communication may take the form of a visual or aural message. The method then returns to block 32.

Referring back to block 100, if scanner 16 is not in the real time mode, then the decoded label is sent to host computer 12 in block 104. In block 106, the total label tally is incremented. In block 108, the method determines whether scanner 16 is in the operation mode. If so, then the method sends a label quality trailer to host computer 12, as represented in block 110, and the method returns to block 32. If not, then the method returns directly to block 32.

Although the present invention has been described with particular reference to certain preferred embodiments thereof, variations and modifications of the present invention can be effected within the spirit and scope of the following claims.

What is claimed is:

1. A system for monitoring barcode label quality during a transaction comprising:
   an optical scanner for reading barcode labels during the transaction;
   means within the optical scanner for sensing a defective barcode label during a scanning operation;
   means for indicating the presence of the defective barcode label to an operator;

means within the optical scanner for making readable a predetermined number of types of defective barcode labels;

means within the optical scanner for tallying the number of barcodes read and the number of defective barcode labels during the transaction; and means within the optical scanner for identifying manufacturers which marked their products with the defective barcode labels.

2. The system as recited in claim 1, further comprising:

memory means within the optical scanner for storing the number of barcode labels read and the number of defective barcode labels.

3. The system as recited in claim 2, further comprising a point-of-service terminal coupled to the optical scanner.

4. The system as recited in claim 3, further comprising:

a host computer coupled to the point-of-service terminal.

5. The system as recited in claim 3, wherein the indicating means provides a displayed message.

6. The system as recited in claim 3, wherein the indicating means provides an aural message.

7. A system for monitoring barcode label quality comprising:

an optical scanner for reading barcode labels;

means within the optical scanner for sensing a defective barcode label during a scanning operation;

means for indicating the presence of the defective barcode label to an operator;

means within the optical scanner for making readable a predetermined number of types of defective barcode labels;

means within the optical scanner for tallying the number of barcode labels read and the number of defective barcode labels by type;

memory means within the optical scanner for storing the number of barcode labels read and the number of defective barcode labels by type; and a point-of-service terminal coupled between the optical scanner and the indicating means.

8. A method of monitoring barcode label quality comprising the steps of:

causing a barcode label to be scanned by an optical scanner;

reading the barcode label if it is non-defective;

alerting an operator if the barcode label is defective;

making readable a predetermined number of types of defective barcode labels; and storing the number of barcodes read and the number of defective barcode labels by type.

9. The method as recited in claim 8, further comprising the step of:

uploading the number of barcodes read and the number of defective barcodes by type to a central computer.

10. The method as recited in claim 8, wherein the step of alerting comprises the substeps of:

communicating a visual message to the operator.

11. The method as recited in claim 8, wherein the step of alerting comprises the substeps of:

communicating an aural message to the operator.

12. The method as recited in claim 8, wherein each type of barcode label is associated with a predetermined manufacture, the method further comprising the step of:

identifying a manufacturer which marks its products with defective barcode labels.

13. A method for monitoring barcode label quality comprising the steps of:

causing a barcode label to be scanned by an optical scanner;

reading the barcode label if it is nondefective;

alerting an operator if the barcode label is defective;

making readable a predetermined number of types of defective barcode labels;

storing the number of barcodes read and the number of defective barcode labels by type, each type of barcode label being associated with a predetermined manufacturer; and identifying a manufacturer which marks its products with defective barcode labels.

14. A system for monitoring barcode label quality during a transaction comprising:

an optical scanner for reading barcode labels during the transaction;

means within the optical scanner for sensing a defective barcode label during a scanning operation; and means within the optical scanner for identifying a manufacturer associated with the defective barcode label.

15. A method of monitoring barcode label quality during a transaction comprising the steps of:

causing a barcode label to be scanned by an optical scanner during the transaction;

if the barcode label is decodable, decoding the barcode label; and if the barcode label is defective, identifying a manufacturer associated with the defective barcode label.

* * * * *